United States Patent
Bi et al.

(10) Patent No.: US 9,262,075 B1
(45) Date of Patent: Feb. 16, 2016

(54) THUMB TYPING KEYBOARD

(71) Applicant: Google Inc., Mountain View, CA (US)

(72) Inventors: Xiaojun Bi, Sunnyvale, CA (US); Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/323,377

(22) Filed: Jul. 3, 2014

(51) Int. Cl.
*G06F 3/02* (2006.01)
*G06F 3/0488* (2013.01)
*G06F 3/023* (2006.01)

(52) U.S. Cl.
CPC .......... *G06F 3/04886* (2013.01); *G06F 3/0233* (2013.01); *G06F 3/04883* (2013.01); *G06F 2203/04808* (2013.01)

(58) Field of Classification Search
CPC ....... G06F 3/044; G06F 3/0416; G06F 3/041; G06F 3/0418
See application file for complete search history.

(56) References Cited

U.S. PATENT DOCUMENTS

| | | | |
|---|---|---|---|
| 7,199,786 B2 | 4/2007 | Suraqui | |
| 7,202,853 B2 | 4/2007 | Ng et al. | |
| 2009/0273567 A1 | 11/2009 | Milley et al. | |
| 2010/0245252 A1* | 9/2010 | Ghassabian | 345/169 |
| 2012/0206363 A1* | 8/2012 | Kyprianou et al. | 345/168 |
| 2012/0206370 A1* | 8/2012 | Ivanovic | 345/173 |
| 2012/0262311 A1* | 10/2012 | Weller | 341/22 |
| 2013/0002565 A1* | 1/2013 | Tumanov et al. | 345/173 |
| 2013/0057475 A1 | 3/2013 | Duggan et al. | |
| 2013/0300664 A1* | 11/2013 | Winer | 345/168 |
| 2014/0189566 A1* | 7/2014 | Kim | 715/773 |

FOREIGN PATENT DOCUMENTS

WO 2006080927 A1 8/2006

OTHER PUBLICATIONS

Kschang, "Android Soft Keyboard Alternatives: Comparing 51 different (free) input methods from ABC Keyboard to ZetaType for Droid," HubPages, Jan. 14, 2013, Retrieved from: <http://hubpages.com/hub/Android-Softkeyboard-Shootout-which-input-method-should-you-use> 37 pp.

Bi et al., "Bimanual Gesture Keyboard," Proceedings of the 25th Annual ACM Symposium on User Interface Software and Technology, UIST 2012, Oct. 2012, 10 pp.

DialKeys Gen2, "Skins Aero Black Large 96 DPI," DialKeys Gen2, Fortune Fountain, Retrieved from <http://www2fl-biz.com/screenshots-skins.html> on Apr. 22, 2014, 2 pp.

(Continued)

*Primary Examiner* — Md Saiful A Siddiqui

(74) *Attorney, Agent, or Firm* — Shumaker & Sieffert P.A.

(57) ABSTRACT

A computing device may output a graphical keyboard for display. The graphical keyboard may comprise a first and a second subset of keys. The first and second subsets of keys may be arranged to form a first shape and a second shape that enclose a first and a second central area of the graphical keyboard, respectively. No key of the first subset of keys is adjacent to more than two other keys in the first subset of keys. No key of the second subset of keys is adjacent to more than two other keys in the second subset of keys. For each respective letter key in the first and second subsets of keys, the respective letter key is positioned within the graphical keyboard at a location that is generally consistent with a position of a key for the letter a QWERTY-style keyboard.

19 Claims, 8 Drawing Sheets

(56) References Cited

OTHER PUBLICATIONS

Oulasvirta et al., Abstract of "Improving Two-Thumb Text Entry on Touchscreen Devices," Proceedings of the 2013 Annual Conference on Human factors in Computing Systems (CHI'13), ACM Press (2013) Apr. 27, 2013, Retrieved from <http://www.mpi-inf.mpg.de/~oantti/KALQ/> 4 pp.

Oulasvirta et al., "Improving Two-Thumb Text Entry on Touchscreen Devices," Proceedings of the 2013 Annual Conference on Human factors in Computing Systems (CHI'13), ACM Press (2013) Apr. 27, 2013, 10 pp.

Bi et al., "Quasi-Qwerty Soft Keyboard Optimization," Proceedings of the 2010 Conference on Interfaces and Visualization (CHI'10), Apr. 10-15, 2010, pp. 283-286.

Beansoft, "Thumb Keyboard," Google Play Apps, Nov. 27, 2013, Retrieved from <https://play.google.com/store/apps/details?id=com.beansoft.keyboardplus> 7 pp.

Computer Hope, "Thumb Keyboard," Computer Hope, 2014 Retrieved from <http://www.computerhope.com/jargon/t/thumbkeyboard.htm> on Apr. 22, 2014, 2 pp.

* cited by examiner

THUMB TYPING KEYBOARD

BACKGROUND

Some computing devices (e.g., mobile phones, tablet computers) provide a graphical keyboard as part of a graphical user interface for composing text. The graphical keyboard may enable a user of the computing device to enter text using a touchscreen. For instance, a touchscreen may display a graphical keyboard and allow the user to enter data by indicating (e.g., by tapping on) keys displayed at the touchscreen.

Two-thumb typing is becoming a popular text-entry mechanism on touchscreen keyboards. In the two-thumb typing technique, users use their thumbs to tap keys of graphical keyboards that are displayed at the touchscreen.

SUMMARY

In one example, this disclosure describes a method comprising outputting, by a computing device and for display, a graphical keyboard. The graphical keyboard comprises a first subset of keys and a second subset of keys. The first subset of keys is arranged to form a first shape that encloses a first central area of the graphical keyboard, such that no key of the first subset of keys is adjacent to more than two other keys in the first subset of keys. The second subset of keys is arranged to form a second shape that encloses a second central area of the graphical keyboard, such that no key of the second subset of keys is adjacent to more than two other keys in the second subset of keys. For each respective letter key in the first subset of keys, the respective letter key in the first subset of keys and at least one adjacent key in the first subset of keys correspond to keys that are positioned adjacent to one another in a standard QWERTY-style keyboard. For each respective letter key in the second subset of keys, the respective letter key in the second subset of keys and at least one adjacent key in the second subset of keys correspond to keys that are positioned adjacent to one another in the standard QWERTY-style keyboard. Each respective letter key in the first subset of keys and each respective letter key in the second subset of keys corresponds to a different letter. The method also comprises, responsive to receiving an indication of user input to select one or more letter keys of the first subset of keys or the second subset of keys, outputting, by the computing device and for display, one or more letters corresponding to the selected one or more letter keys of the first subset of keys or the second subset of keys.

In another example, this disclosure describes a computing device comprising one or more processors. The one or more processors are configured to output, for display, a graphical keyboard. The graphical keyboard comprises a first subset of keys and a second subset of keys. The first subset of keys is arranged to form a first rectangle or ellipse that encloses a first central area of the graphical keyboard, such that no key of the first subset of keys is adjacent to more than two other keys in the first subset of keys. The second subset of keys is arranged to form a second rectangle or ellipse that encloses a second central area of the graphical keyboard, such that no key of the second subset of keys is adjacent to more than two other keys in the second subset of keys, for each respective letter key in the first subset of keys, the respective letter key in the first subset of keys and at least one adjacent key in the first subset of keys correspond to keys that are positioned adjacent to one another in a standard QWERTY-style keyboard. For each respective letter key in the second subset of keys, the respective letter key in the second subset of keys and at least one adjacent key in the second subset of keys correspond to keys that are positioned adjacent to one another in the standard QWERTY-style keyboard. Each respective letter key in the first subset of keys and each respective letter key in the second subset of keys corresponds to a different letter. The one or more processors are configured to output responsive to receiving an indication of user input to select one or more letter keys of the first subset of keys or the second subset of keys, output, for display, one or more letters corresponding to the selected one or more letter keys of the first subset of keys or the second subset of keys.

In another example, this disclosure describes a non-transitory computer-readable data storage device having instructions stored thereon that when executed cause a computing device to: output, for display, a graphical keyboard. The graphical keyboard comprises a first subset of keys and a second subset of keys. The first subset of keys is arranged to form a first rectangle that encloses a first central area of the graphical keyboard, such that no key of the first subset of keys is adjacent to more than two other keys in the first subset of keys. The second subset of keys is arranged to form a second rectangle that encloses a second central area of the graphical keyboard, such that no key of the second subset of keys is adjacent to more than two other keys in the second subset of keys. For each respective letter key in the first subset of keys, the respective letter key in the first subset of keys and at least one adjacent key in the first subset of keys correspond to keys that are positioned adjacent to one another in a standard QWERTY-style keyboard. For each respective letter key in the second subset of keys, the respective letter key in the second subset of keys and at least one adjacent key in the second subset of keys correspond to keys that are positioned adjacent to one another in the standard QWERTY-style keyboard. Each respective letter key in the first subset of keys and each respective letter key in the second subset of keys corresponds to a different letter. For each respective key in the first subset of keys, the respective key is adjacent to at most two other keys in the first subset of keys in a horizontal or vertical direction. For each respective key in the second subset of keys, the respective key is adjacent to at most two other keys in the second subset of keys in a horizontal or vertical direction. In addition, the instructions cause the computing device to output, responsive to receiving an indication of user input to select one or more letter keys of the first subset of keys or the second subset of keys, for display, one or more letters corresponding to the selected one or more letter keys of the first subset of keys or the second subset of keys.

One or more examples are set forth in the accompanying drawings and the description below. Other features, objects, and advantages will be apparent from the description, drawings, and claims.

DETAILED DESCRIPTION

In some implementations, a computing device may output a graphical keyboard for display at a display device. The graphical keyboard may comprise two groups of keys. The first group of keys may be arranged to form a shape (e.g., a square, a circle) that encloses a first central area of the graphical keyboard. In at least some examples, none of the keys in the first group is adjacent to more than two other keys in the first group. The second group of keys may be arranged to form a shape (e.g., a square, a circle) that encloses a second central area of the graphical keyboard. In at least some examples, no key of the second group is adjacent to more than two other keys in the second group. Letters may be associated with the keys to approximate the layout of keys in a standard QWERTY-style keyboard. For example, for each respective letter key in the first group, the respective key in the first group and at least one adjacent key in the first group correspond to keys that are positioned adjacent to one another in a standard QWERTY-style keyboard. In this example, for each respective letter key in the second group, the respective key in the second group and at least one adjacent key in the second group correspond to keys that are positioned adjacent to one another in the standard QWERTY-style keyboard.

Some graphical keyboards according this disclosure may, in some instances, increase the efficiency with which a user can employ a two-thumb text entry technique to input text. Furthermore, because the graphical keyboards of this disclosure retain a layout similar to a standard QWERTY-style keyboard, it may be easier for users to employ graphical keyboards according to this disclosure. In this way, the functionality of computing devices implementing keyboards according to this disclosure may be improved and particular issues associated with user input may be resolved.

Figure 1:
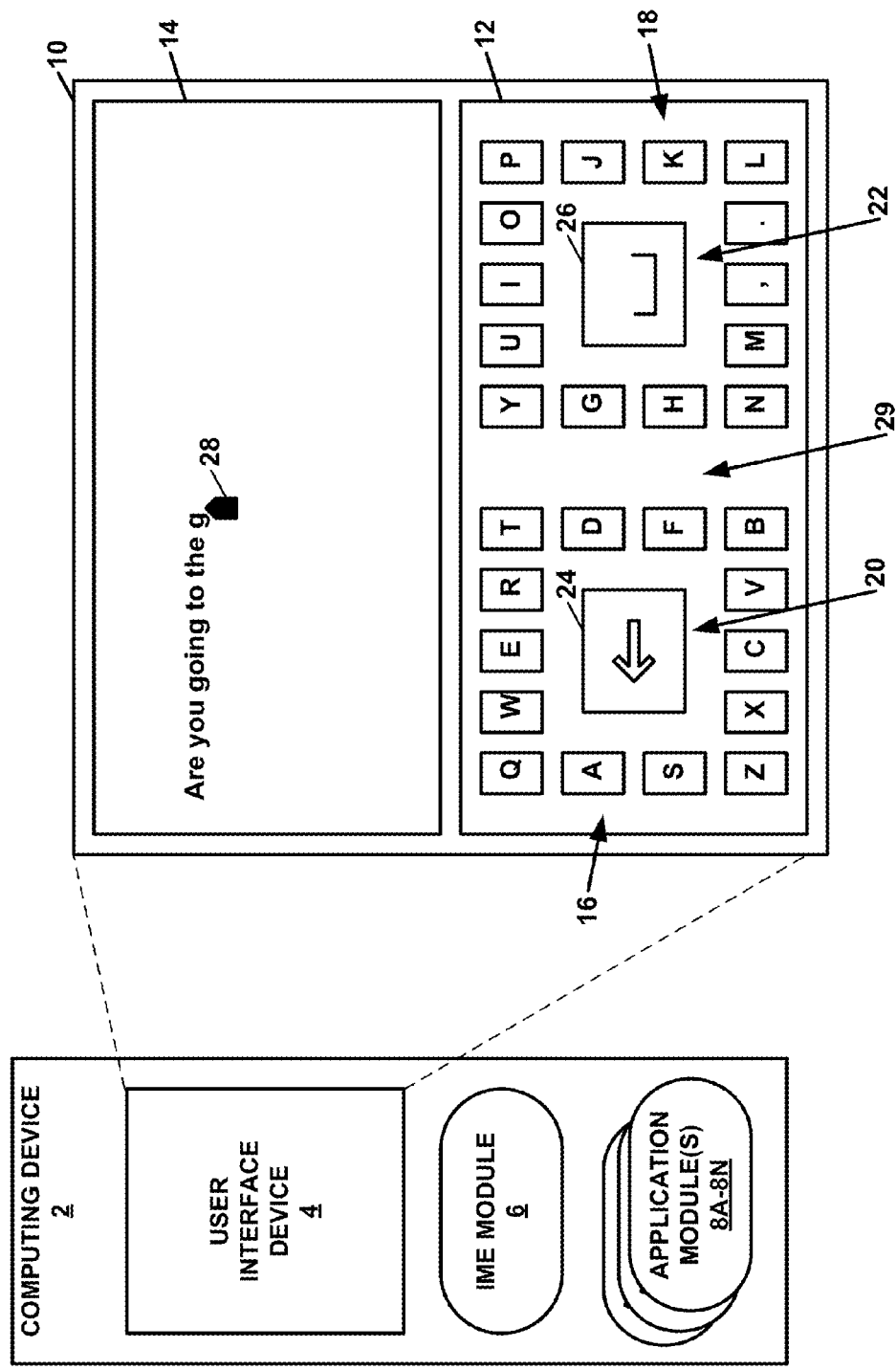
FIG. 1 is a conceptual diagram illustrating an example computing device that is configured to receive indications of user input from a graphical keyboard, in accordance with one or more techniques of the present disclosure.

FIG. 1 is a conceptual diagram illustrating an example computing device 2 that is configured to receive indications of user input from a graphical keyboard, in accordance with one or more techniques of this disclosure. Computing device 2 may comprise one of various types of computing devices. For example, computing device 2 may comprise a mobile device, such as a mobile telephone, a tablet computer, a notebook or laptop computer, a personal media player, a portable gaming device, or another type of computing device designed for mobility. In other examples, computing device 2 may comprise other types of computing devices, such as desktop computers, point of sale devices, televisions, gambling devices, appliances, in-car computers, and other types of devices. Furthermore, in some examples, the term "computing device" may refer to a set of one or more integrated circuits, such as microprocessors, chipsets, and so on.

In the example of FIG. 1, computing device 2 includes at least one user interface (UI) device 4. UI device 4 may comprise a display device that displays graphical data and may also comprise a presence-sensitive input device that detects the presence of one or more input objects, such as fingers or styli. Because UI device 4 may display graphical data and may detect the presence of one or more input objects, UI device 4 may, in some examples, be referred to as a presence-sensitive display device. UI device 4 may be implemented using various technologies. For example, UI device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, UI device 4 may be able to detect the presence of an input object without the input object physically touching UI device 4. For example, in some such examples, UI device 4 may be able to detect the presence of the input object when the input object is within a particular space.

UI device 4 may be operatively coupled to computing device 2 in various ways. For example, UI device 4 may be integrated into a housing of computing device 2 and may be connected to computing device 2 via one or more internal connectors. In another example, UI device 4 may be external to a housing of computing device 2 and may communicate with computing device 2 via one or more external cables and/or communication networks.

Although the example of FIG. 1 assumes that UI device 4 is a presence-sensitive display device, the techniques of this disclosure are not so limited. In other examples, UI device 4 may be a display device that does not detect the presence of input objects. In some such examples, another device (e.g., one or more cameras, motion sensors, and/or other types of sensors) may detect the presence of input objects.

In the example of FIG. 1, computing device 2 outputs a graphical user interface (GUI) 10 for display at UI device 4. In general, a GUI may be a type of user interface that allows a user to interact with a computing device. GUI 10 may include a graphical keyboard 12. Graphical keyboard 12 may include a set of graphical keys. At least some of the graphical keys are associated with one or more characters (e.g., letters, symbols, etc.). In other examples, one or more of the techniques of this disclosure may be implemented using a physical keyboard instead of a graphical keyboard.

In addition, GUI 10 may include a text entry area 14. Computing device 2 may output text for display in text entry area 14 in response to receiving indications of user input. In some examples, text entry area 14 may be a field or area where user-entered text appears.

Furthermore, in the example of FIG. 1, computing device 2 includes an input method editor (IME) module 6. IME module 6 may receive indications of user input (i.e., user input indications). The user input indications may comprise data that indicate user input received by computing device 2 and/or another device. IME module 6 may receive various types of user input indications. For example, IME module 6 may receive user input indications that indicate presses and releases of keys on a physical keyboard. In another example, IME module 6 may receive user input indications that indicate movements of one or more input objects. In this example, UI device 4 or another device may detect the movements of the one or more input objects. In another example, IME module 6 may receive user input indications that correspond to tapping gestures at various locations, such as graphical keys on graphical keyboard 12. In this example, the user input indications may correspond to tapping gestures at portions of a display device (e.g., UI device 4) that display graphical keys associated with characters.

In another example, IME module 6 may receive a user input indication that corresponds to a gesture termination event. In this example, the gesture termination event may occur when a presence-sensitive input device (such as UI device 4) is no longer able to detect the presence of an input object. In some examples, a presence-sensitive input device may be no longer able to detect the presence of an input object when a user lifts the input object off of the presence-sensitive input device. In other examples, IME module 6 may determine that a user input indication corresponds to a gesture termination event when the user input indication indicates the occurrence of a particular movement of one or more input objects.

IME module 6 may determine that particular user input indications correspond to strings of one or more characters (i.e., character strings). In various examples, IME module 6 may determine that particular user input indications correspond to character strings that match words in various languages, such as English, Russian, French, Japanese, Korean, Chinese, Hindi, Arabic, and so on.

In the example of FIG. 1, computing device 2 also includes application module(s) 8A-8N (collectively, "application module(s) 8"). Execution of instructions in application module(s) 8 may cause computing device 2 to provide various applications (e.g., "apps"). The applications may comprise user application, operating system applications, or other types of applications. In some examples, IME module 6 may output the character strings determined by IME module 6 to one or more of application module(s) 8. Application module(s) 8 may process the character strings received from IME module 6. In some examples, an application module may output, in response to receiving a character string from IME module 6, the character string for display by a display device, such as UI device 4. However, in such examples, for ease of explanation, this disclosure may indicate that IME module 6 receives indications of user input and outputs graphical data (e.g., text) for display.

Furthermore, when IME module 6 receives one or more user input indications, IME module 6 may determine whether the one or more user input indications correspond to a character string. For example, IME module 6 may receive indications that UI device 4 detected a series of tapping gestures at locations that correspond to graphical keys of graphical keyboard 12. In this example, IME module 6 may determine that the series of tapping gestures corresponds to a character string that comprises characters associated with the graphical keys at which UI device 4 detected the tapping gestures.

In the example of FIG. 1, graphical keyboard 12 may be designed for text entry using two thumbs. Although the layout of graphical keyboard 12 may be particularly suited for text input using two thumbs, the layout of graphical keyboard 12 may also be used with one finger or a stylus. For ease of explanation, this disclosure assumes that the user's thumbs are used to select keys of graphical keyboard 12. Nevertheless, many examples of this disclosure referencing the user's thumbs may have corresponding examples with one or more fingers or a stylus. The layout of graphical keyboard 12 may be particularly advantageous on devices having 5 to 8 inch diagonal dimensions.

To potentially ease and/or accelerate text entry when a user is using two thumbs to input text, graphical keyboard 12 comprises a first subset of keys 16 and a second subset of keys 18. For ease of explanation, this disclosure may refer to the first subset of keys 16 as "subset 16" and may refer to the second subset of keys 18 as "subset 18." For instance, to ease text entry using two thumbs, IME module 6 may output graphical keyboard 12 for display such that each key of subset 16 is accessible by a first thumb of a user and each key of subset 18 is accessible by a second thumb of the user without the user adjusting a grip of the user on a housing of computing device 2.

In at least some examples, each key of a standard QWERTY-style keyboard has a corresponding key in either subset 16 or subset 18. Furthermore, in some examples, each letter key in graphical keyboard 12 is either in subset 16 or subset 18. For instance, subset 16 includes keys corresponding to the letters Q, W, E, R, T, A, D, S, F, Z, X, C, V, and B, and subset 18 includes keys corresponding to the letters Y, U, I, O, P, G, J, H, K, L, N, and M. In some examples, subset 16 and/or subset 18 may include one or more keys corresponding to other symbols (e.g., punctuation marks) or functions. For instance, in the example of FIG. 1, subset 18 includes keys corresponding to the "," and "." characters.

In each letter key in graphical keyboard 12 (i.e., a key corresponding to a letter) may have at most two adjacent letter keys, which may increase accuracy of typing. The fact that each letter key only corresponds to two adjacent letter keys may increase accuracy of typing because the user is less likely to select an adjacent letter key accidentally when aiming for a particular letter key if there are fewer letter keys adjacent to the particular letter key. In contrast, in a traditional QWERTY layout many keys have eight adjacent keys. Accordingly, it is very common that a user mistakenly taps adjacent keys when typing quickly on a standard QWERTY-style keyboard.

In accordance with one or more techniques of this disclosure, subset 16 may be arranged to form a first shape that encloses a first central area 20 of graphical keyboard 12. For instance, in the example of FIG. 1, subset 16 is arranged to form a square shape that encloses central area 20. In other examples, subset 16 may be arranged to form other shapes (e.g., rectangles, circles, ovals, ellipses, hexagons) enclosing or otherwise surrounding central area 20. In this disclosure, squares are a particular type of "rectangle." Thus, central area 20 may be defined as the area enclosed by the keys of subset 16. No key of subset 16 is adjacent to more than two other keys in subset 16. In some examples, no key of subset 16 is adjacent to more than three other keys in subset 16. In some examples where the first shape includes one or more corners, two keys of subset 16 are not considered to be adjacent if they are diagonally positioned across a corner from one another. For instance, in the example of FIG. 1, the keys corresponding to the letters "A" and "W" are not considered to be adjacent. However, the keys corresponding to the letters "A" and "Q" are considered to be adjacent and the keys corresponding to the letters "Q" and "W" are considered to be adjacent.

Similarly, subset 18 may be arranged to form a second shape that encloses a second central area 22 of graphical keyboard 12. In other words, central area 22 may be defined as the area enclosed by the keys of subset 18. For instance, in the example of FIG. 1, subset 18 is arranged to form a square shape that encloses central area 22. Thus, in some examples, each of the shapes formed by subsets 16 and 18 is a rectangle or a square. In other examples, subset 18 may be arranged to form other shapes (e.g., rectangles, circles, ovals, hexagons) enclosing central area 22. No key of subset 18 is adjacent to more than two other keys in subset 18. In some examples, no key of subset 18 is adjacent to more than three other keys in subset 18. In some examples, such as the example of FIG. 1, for each respective key in subset 16, the respective key is adjacent to at most two other keys in the first subset of keys in a horizontal or vertical direction. Furthermore, in such examples, for each respective key in subset 18, the respective key is adjacent to at most two other keys in subset 18 in a horizontal or vertical direction.

In at least some examples, central area 20 does not overlap with central area 22. In other words, central area 20 may be separate from central area 22. Otherwise stated, the shapes defined by subsets 16 and 18 to not intersect.

For each respective letter key in subset 16, the respective key in subset 16 and at least one adjacent key in subset 16 correspond to keys that are positioned adjacent to one another in a standard QWERTY-style keyboard. Similarly, for each respective letter key in subset 18, the respective key in subset 18 and at least one adjacent key in subset 18 correspond to keys that are positioned adjacent to one another in the standard QWERTY-style keyboard. In this disclosure, each respective letter key in the first subset of keys and each respective letter key in the second subset of keys corresponds to a different letter.

For example, the standard QWERTY-style keyboard comprises three rows of keys corresponding to letters. The top row of the standard QWERTY-style keyboard includes keys corresponding to the letters Q, W, E, R, T, Y, U, I, 0, and P. The middle row of the standard QWERTY-style keyboard includes keys corresponding to the letters A, S, D, F, G, H, J, K, and L. The bottom row includes keys corresponding to the letters Z, X, C, V, B, N, and M. In general, the rows of keys of a standard QWERTY-style keyboard are somewhat offset such that the leftmost letter keys of a standard QWERTY-style keyboard (i.e., Q, A, and Z) are arranged along a diagonal line that slants downward to the right. Other keys of the standard QWERTY-style keyboard (e.g., W, S, and X, E, D, and C) are arranged along other (e.g., parallel) diagonal lines that slant downward to the right. Furthermore, the offset of the rows of keys may result in the keys of a standard QWERTY-style keyboard lying on diagonal lines that slant downward to the left. For instance, the keys corresponding to ESZ, RDX, TFC, etc. lie on diagonal lines that slant downward to the left.

Letter keys located next to one another along such diagonal lines that slant downward to the right or downward to the left may be considered to be adjacent to one another in a standard QWERTY-style keyboard. For example, the keys corresponding to the letters E and S are adjacent to one another and the keys corresponding to the letters W and S are adjacent to one another. However, the keys corresponding to E and Z are not adjacent despite lying on the same diagonal line sloping downward to the left. Furthermore, keys located next to one another in a row of keys in a standard QWERTY-style keyboard are adjacent to one another. For instance, the keys corresponding to the letters Q and W are adjacent to one another and the keys corresponding to the letters W and E are adjacent to one another, but the keys corresponding to the letters Q and E are not adjacent to one another.

In some examples, such as the example of FIG. 1, subset 16 comprises letter keys corresponding to letters Q, W, E, R, T, A, D, S, F, Z, W, X, C, V, and B and subset 18 comprises letter keys corresponding to letters Y, U, I, O, P, G, J, H, K, N, M, and L. In some such examples, subset 16 and subset 18 may form rectangles. In such examples, a top row of subset 16 consists of letter keys corresponding to letters Q, W, E, R, and T; a top row of subset 18 consists of letter keys corresponding to letters Y, U, I, O, P; a second row of subset 16 consists of letter keys corresponding to letters A and D; a second row of subset 18 consists of letter keys corresponding to letters G and J; a third row of subset 16 consists of letter keys corresponding to letters S and F; a third row of subset 18 consists of letter keys corresponding to letters H and K; a fourth row of subset 16 consists of letter keys corresponding to letters Z, X, C, V, and B; and a fourth row of subset 18 comprises letter keys corresponding to letters N, M, and L.

As indicated above, for each respective letter key in subset 16, the respective letter key in subset 16 and at least one adjacent key in subset 16 correspond to keys that are positioned adjacent to one another in the standard QWERTY-style keyboard. A letter key in graphical keyboard 12 may correspond to a letter key in the standard QWERTY-style keyboard if the two letter keys correspond to the same letter. Hence, in accordance with the techniques of this disclosure, the keys corresponding to the letters A and Q are adjacent to one another in graphical keyboard 12 and also adjacent to one other in the standard QWERTY-style keyboard. Not all keys that are adjacent to one another in the standard QWERTY-style keyboard are adjacent to corresponding keys in graphical keyboard 12. For instance, keys corresponding to the letters A and Z are adjacent in the standard QWERTY-style keyboard, but are not adjacent in graphical keyboard 12.

Because letter keys in subset 16 and subset 18 have this relationship with corresponding letter keys in the standard QWERTY-style keyboard, users may find it easier to learn to use keyboard 12 than to learn to use keyboards whose letter keys do not have this relationship with corresponding letter keys in the standard QWERTY-style keyboard. In other words, the layout of graphical keyboard 12 may share a great deal of familiarity with the traditional QWERTY layout, which may help users quickly learn the layout of graphical keyboard 12 and type fast. For instance, in the example of FIG. 1, the top row (i.e., first row) of keys in graphical keyboard 12 is the same as the top row of keys in the standard QWERTY-style keyboard. Furthermore, in the example of FIG. 1, the bottom row (i.e., last row) of graphical keyboard 12 is the same as the bottom row of the standard QWERTY-style keyboard, except for the last letter L. In the example of FIG. 1, the nine letters in the middle row of the standard QWERTY-style keyboard are arranged in graphical keyboard 12 on the vertical sides of the two squares formed by the keys of subsets 16 and 18.

Responsive to receiving an indication of user input to select one or more letter keys of subset 16 or subset 18, IME module 6 may output, for display in text entry area 14, one or more letters corresponding to the selected one or more letter keys of subset 16 or keys 18. For instance, in the example of FIG. 1, the user may be inputting the sentence "Are you going to the game?" However, the user has only input the first letter of the word "game." Accordingly, the user may select the letter key of subset 16 corresponding to the letter "a." Responsive to receiving an indication of the user input to select the letter key corresponding to the letter "a," IME module 6 may output, for display in text entry area 14, the letter "a" at a position indicated by cursor 28.

Central area 20 and central area 22 may each comprise one or more keys of graphical keyboard 12. For instance, commonly used keys, such as space and backspace, may have a distinct size and may be placed in the centers of the shapes (e.g., squares) defined by subsets 16 and 18 to enable quick and easy access to such commonly used keys. In the example of FIG. 1, central area 20 comprises a central key 24 that corresponds to backspace. Computing device 2 may delete a previously entered letter in text entry area 14 in response to receiving an indication of user input to select a key corresponding to backspace. Furthermore, in the example of FIG. 1, central area 22 comprises a central key 26 that corresponds to the space character. Computing device 2 may output a space character for display in text entry area 14 in response to receiving an indication of user input to select central key 26. Thus, in the example of FIG. 1, the layout of graphical keyboard 12 is arranged into two squares with larger sized space and backspace keys in the centers. In other words, central area 20 comprises a first central key 24 of graphical keyboard 12, the first central key corresponding to a backspace character, and central area 22 comprises a second central key 26 of graphical keyboard 12, the second central key corresponding to a space character. In other examples, keys corresponding to other characters, symbols, or functions may be included in central areas 20 and 22. In some examples, the keys in central areas 20 and 22 may be assigned characters, symbols, functions, etc. according to user preference.

Graphical keyboard 12 may comprise a gap (e.g., a vertical gap) separating subset 16 and subset 18. In some examples, a width of the gap is greater than a distance between any two keys in subsets 16 or 18. In the example of FIG. 1, the gap separating subsets 16 and 18 is illustrated as area 29. Although not illustrated in the example of FIG. 1, graphical keyboard 12 may include one or more keys located in the area 29 between subset 16 and subset 18. In other words, graphical keyboard 12 may comprise one or more keys that do not correspond to letters and that are positioned between subsets 16 and 18. The keys located in area 29 may correspond to various punctuation marks, brackets, diacritical marks, mathematical operators, symbols, numbers, functions, and so on. For instance, keys corresponding to the numbers 0 to 9 may be located in area 29. The letters, functions, or symbols corresponding to keys in area 29 may be less frequently used than those in subsets 16 and 18. In other examples, area 29 may include word suggestion elements. In such examples, each of the word suggestion elements may include a suggested word. IME module 6 may output a suggested word in text entry area 14 in response to receiving an indication of user input of a word suggestion element corresponding to the suggested word. In other examples, central areas 20, 22 may include word suggestion elements.

This disclosure may refer to the keys shown in the example FIG. 1 as primary keys. IME module 6 may add additional symbol or function keys to graphical keyboard 12 in response receiving one or more indications of user input. For example, IME module 6 may output, for display in text input area 14, an alternate version of a letter (e.g., a version of a letter with a diacritical mark) in response to receiving an indication of user input of a long press on a key of graphical keyboard 12 corresponding to the letter. A long press (i.e., a long tap gesture) may be a gesture in which an input object (e.g., a thumb) is stationary at a position for an amount of time greater than a threshold amount of time (e.g., 1 second).

In another example, IME module 6 may replace the keys of subset 16 with alternate keys in response to receiving an indication of a long press on a key (e.g., central key 24) in central area 20. In other words, computing device 2 may receive an indication of a second user input, the second user input corresponding to a long tap gesture at a location corresponding to the first central area. Responsive to receiving the indication of the second user input, computing device 2 may output, for display, keys corresponding to alternate symbols or operations in place of the first subset of keys. In a similar fashion, IME module 6 may replace the keys of subset 18 with alternate keys in response to receiving an indication of a long press on a key (e.g., central key 26) in central area 22. For instance, in some examples, IME module 6 may replace letter keys of subset 16 or subset 18 with similarly positioned keys corresponding to capitalized or non-capitalized versions of letters keys of subset 16 or subset 18. In some examples, IME module 6 may replace the keys of subset 16 or subset 18 with similarly positioned keys corresponding to functions or operations. In some examples, IME module 6 may replace subset 16 with another set of keys without replacing subset 18 with another set of keys.

Replacing keys of subsets 16 and/or 18 with keys corresponding to functions or operations may enable effective radial menu use, especially when the user selects a key of graphical keyboard 12 by sliding the user's thumb in a direction of the key. For instance, a radial menu may include elements for copy, paste, cut, bold, italic, underline, etc.

Figure 2:
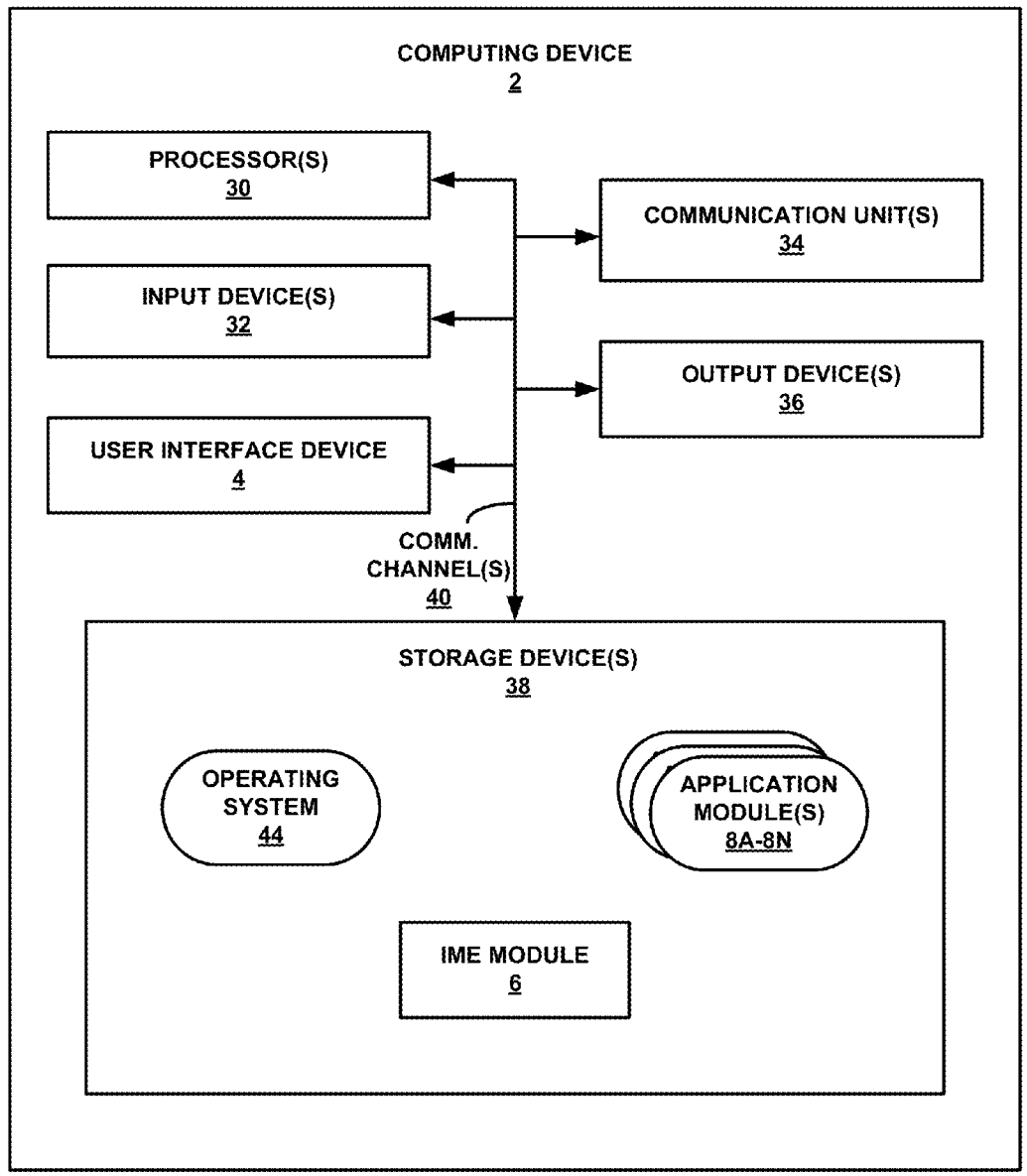
FIG. 2 is a block diagram illustrating one example of the computing device shown in FIG. 1, in accordance with one or more techniques of the present disclosure.

FIG. 2 is a block diagram illustrating one example of computing device 2 shown in FIG. 1, in accordance with one or more techniques of this disclosure. For purposes of illustration, the discussion of FIG. 2 and the following figures includes continued references to FIG. 1. However, the techniques of this disclosure are not so limited. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and UI device 4. Computing device 2 may include many other components. For example, computing device 2 may include physical buttons, microphones, speakers, communication ports, and so on.

Communication channel(s) 40 may interconnect each of components 30, 32, 34, 36, 38, and 4 for inter-component communications (physically, communicatively, and/or operatively). In some examples, communication channel(s) 40 may include a system bus, a network connection, an inter-process communication data structure, or any other method for communicating data.

Storage device(s) 38 may store information required for use during operation of computing device 2. Storage device(s) 38, in some examples, have the primary purpose of being a short term and not a long-term computer-readable storage medium. Storage device(s) 38 may be volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 30 on computing device 2 read and may execute instructions stored by storage device(s) 38.

Computing device 2 may include one or more input device(s) 32 that computing device 2 uses to receive user input. Examples of user input include tactile, audio, and video user input. Input device(s) 32 may include presence-sensitive screens, touch-sensitive screens, mice, keyboards, voice responsive systems, video cameras, microphones or other types of devices for detecting input from a human or machine.

Communication unit(s) 34 may enable computing device 2 to send data on and receive data from a communications network, such as a local area network or the Internet. In some examples, communication unit(s) 34 may include wireless transmitters and receivers that enable computing device 2 to communicate wirelessly with the communications network. Examples of communication unit(s) 34 may include network interface cards, Ethernet cards, optical transceivers, radio frequency transceivers, or other types of devices that are able to send and receive information. Other examples of such communication units may include Bluetooth, 3G, and WiFi radios, Universal Serial Bus (USB) interfaces, etc.

Output device(s) 36 may generate output. Examples of output include tactile, audio, and video output. Output device(s) 36 may include presence-sensitive screens, sound cards, video graphics adapter cards, speakers, cathode ray tube (CRT) monitors, liquid crystal displays (LCD), or other types of devices for generating output.

Processor(s) 30 may read instructions from storage device(s) 38 and may execute instructions stored by storage device(s) 38. Execution of the instructions by processor(s) 30 may configure or cause computing device 2 to provide at least some of the functionality ascribed in this disclosure to computing device 2. As shown in the example of FIG. 2, storage device(s) 38 include computer-readable instructions associated with operating system 44, IME module 6, and application modules 8A-8N. Execution of instructions associated with operating system 44 may cause computing device 2 to perform various functions to manage hardware resources of computing device 2 and to provide various common services for other computer programs. Execution of instructions associated with application modules 8 may cause computing device 2 to provide various applications (e.g., "apps," operating system applications, etc.).

Application modules 8 may provide particular applications, such as text messaging (e.g., SMS) applications, instant messaging applications, email applications, social media applications, text composition applications, and so on. Application modules 8 may invoke IME module 6 when application modules 8 need to provide a mechanism for enabling the user to input text. In some examples, application modules 8 may directly invoke IME module 6. In other examples, application modules 8 may invoke IME module 6 through one or more functions of operating system 44. In response to being invoked by an application, IME module 6 may output a graphical keyboard for display within or overlaid on a user interface of the application. IME module 6 may then receive indications of user input and determine character strings (e.g., one or more characters) that correspond to the user input. IME module 6 may then provide the character strings to the application. In some examples, responsive to receiving an indication of user input to select one or more letter keys of graphical keyboard 12, the application may output, for display at user interface device 4 and/or one or more of output devices 36, one or more letters corresponding to the selected one or more letter keys.

In accordance with one or more techniques of this disclosure, the graphical keyboard output for display by IME module 6 may comprise a plurality of keys. Plurality of keys may include a first and second subset (e.g., subsets 16 and 18). The first subset of keys may be intended for use by the user's left thumb. The second subset of keys may be intended for use by the user's right thumb. Accordingly, the first subset of keys may be located left of the second subset of keys. In some examples, the first subset of keys is located above the second subset of keys. In some examples, the second subset of keys is located above the first subset of keys.

The first subset of keys may be arranged in such a way as to form a shape that encloses a first central region of graphical keyboard 12 (e.g., central area 20). In other words, the boundaries of the first central region may be defined by the keys of the first subset of keys. Similarly, the second subset of keys may be arranged in such a way as to form a same or different shape that encloses a second central region of graphical keyboard 12 (e.g., central area 22). In other words, the boundaries of the second central region may be defined by the keys of the second subset of keys. In some examples, the first and second central regions may include one or more keys of graphical keyboard 12. However, in at least some examples, such keys in the first and second central regions do not correspond to letters. Rather, keys in the first and second central regions may correspond to other symbols or functions, such as numbers, punctuation marks, brackets, mathematical operators, diacritical marks, backspace functions, enter functions, shift functions, control functions, cap lock functions, keyboard replacement functions, and so on. A keyboard replacement function may replace a graphical keyboard with another graphical keyboard. For instance, a keyboard replacement function may replace a keyboard comprising keys corresponding to letters with a keyboard comprising keys corresponding to numbers.

Furthermore, in accordance with one or more techniques of this disclosure, IME module 6 may output graphical keyboard 12 such that no key of the first subset of keys is adjacent to more than two other keys in the first subset of keys. Similarly, in accordance with one or more techniques of this disclosure, IME module 6 may output graphical keyboard 12 such that no key of the second subset of keys is adjacent to more than two other keys in the second subset of keys. For example, the first subset may be arranged such that for each respective key of the first subset, no other key of the first subset is located between the respective key and the first central region. Similarly, in this example, the second subset may be arranged such that for each respective key of the second subset, no other key of the second subset is located between the respective key and the second central region.

For each respective letter key in the first subset of keys, IME module 6 may output graphical keyboard 12 such that for each respective letter key in the first and second subsets of keys, the respective letter key is positioned within the graphical keyboard at a location that is generally consistent with a position of a key for the letter in the standard QWERTY-style keyboard. For example, the respective key in the first subset of keys and at least one adjacent key in the first subset of keys correspond to keys that are positioned adjacent to one another in a standard QWERTY-style keyboard. For each respective letter key in the second subset of keys, the respective key in the second subset of keys and at least one adjacent key in the second subset of keys correspond to keys that are positioned adjacent to one another in the standard QWERTY-style keyboard, wherein each respective letter key in the first subset of keys and each respective letter key in the second subset of keys corresponds to a different letter.

Figure 3:
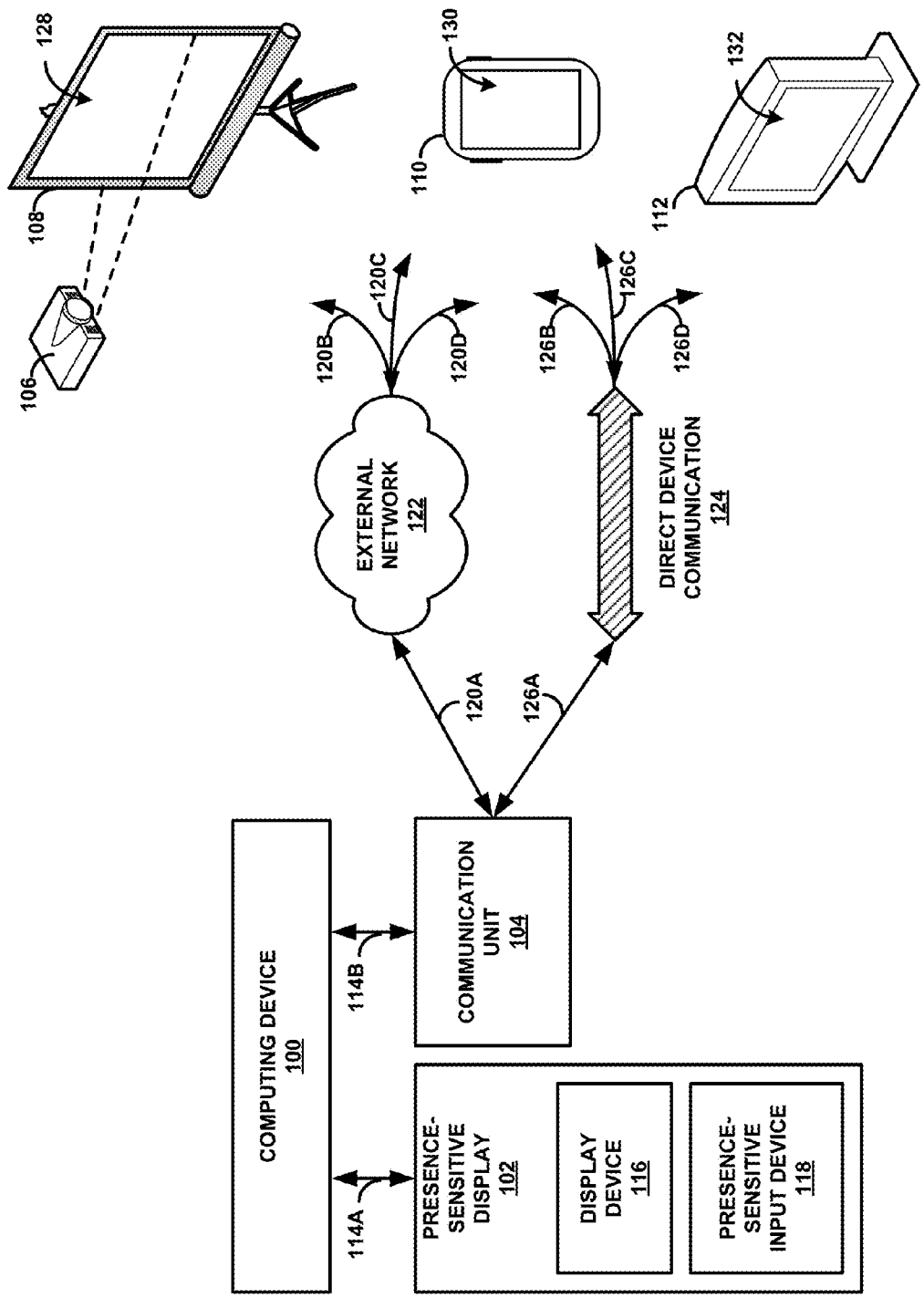
FIG. 3 is a block diagram illustrating an example in which a computing device outputs graphical content for display at one or more remote display devices, in accordance with one or more techniques of the present disclosure.

FIG. 3 is a block diagram illustrating an example computing device 100 that outputs data for display by one or more remote devices, in accordance with one or more techniques of the present disclosure. In some examples, computing device 100 may be one example of computing device 2 (FIG. 1, FIG. 2). The one or more remote devices may display graphical content based on the data output by computing device 100. In general, graphical content may include any visual information that may be output for display, such as text, images, a group of moving images, etc. In some examples, computing device 100 may output data, such as Hypertext Markup Language (HTML) data, that a remote device may render to generate graphical content displayed by the remote device. In other examples, computing device 100 may output digital or analog signals that a remote device may use to generate graphical content displayed by the remote device.

In the example of FIG. 3, computing device 100 is operatively coupled to a presence-sensitive display 102 and a communication unit 104. Furthermore, in the example of FIG. 3, the one or more remote devices include a projector 106, a projection screen 108, a mobile device 110, and a visual display device 112. Computing device 100 may include and/ or be operatively coupled to one or more other devices, e.g., input devices, output devices, memory, storage devices, etc. that are not shown in FIG. 3 for purposes of brevity and illustration.

Computing device 100 may be a processor that has the functionality described above with respect to processor(s) 30 (FIG. 2). For instance, computing device 100 may be a microprocessor, ASIC, or another type of integrated circuit configured to implement the techniques of this disclosure. In other examples, such as those illustrated in FIGS. 1 and 2, computing device 100 may be a stand-alone computing device that includes or is operatively coupled to a presence-sensitive display. In such examples, computing device 100 may be a desktop computer, a tablet computer, a smart television platform, a camera, a personal digital assistant (PDA), a server device, a mainframe computer, a telephone, a portable gaming device, a personal media player, a remote control device, a wearable computing device, or another type of computing device. In this disclosure, a first device may be said to be operatively coupled to a second device if the operations of the first and second devices are coupled in some way.

Computing device 100 may communicate with presence-sensitive display 102 via a communication channel 114A. Computing device 100 may communicate with communication unit 104 via a communication channel 114B. Communication channels 114A, 114B may each include a system bus or another suitable connection. Although the example of FIG. 3 shows computing device 100, presence-sensitive display 102, and communication unit 104 as being separate, computing device 100, presence-sensitive display 102, and/or communication unit 104 may be integrated into a single device.

In the example of FIG. 3, presence-sensitive display 102 includes a display device 116 and a presence-sensitive input device 118. Display device 116 may display graphical content based on data received from computing device 100. Presence-sensitive input device 118 may determine one or more user inputs (e.g., continuous gestures, multi-touch gestures, single-touch gestures, etc.). Presence-sensitive input device 118 may use capacitive, inductive, and/or optical recognition techniques to determine the user inputs. Presence-sensitive display 102 may send indications of such user inputs to computing device 100 via communication channel 114A or another communication channel. In some examples, presence-sensitive input device 118 is physically positioned relative to display device 116 such that presence-sensitive input device 118 is able to detect the presence of an input object (e.g., a finger or a stylus) at a location on display device 116 that displays a graphical element when a user positions the input object at the location on display device 116 that displays the graphical element.

Communication unit 104 may have the functionality of one or more of communication unit(s) 34. This disclosure describes the functionality of communication unit 34 with regard to FIG. 2. Examples of communication unit 104 may include network interface cards, Ethernet cards, optical transceivers, radio frequency transceivers, Bluetooth, 3G, and WiFi radios, Universal Serial Bus (USB) interfaces, or other types of devices that are able to send and receive data. When computing device 100 outputs data for display by the one or more remote devices (such as projector 106, projection screen 108, mobile device 110, and visual display device 112), computing device 100 may output the data to a communication unit of computing device 100, such as communication unit 104. Communication unit 104 may send the data to one or more of the remote devices. The one or more remote devices may display graphical content based at least in part on the data.

Communication unit 104 may send and receive data using various communication techniques. In the example of FIG. 3, a network link 120A operatively couples communication unit 104 to an external network 122. Network links 120B, 120C, and 120D may operatively couple each of the remote devices to external network 122. External network 122 may include network hubs, network switches, network routers, or other types of devices that exchange information between computing device 100 and the remote devices illustrated in FIG. 3. In some examples, network links 120A-120D may be Ethernet, ATM or other wired and/or wireless network connections.

In some examples, communication unit 104 may use direct device communication 124 to communicate with one or more of the remote devices included in FIG. 3. Direct device communication 124 may include communications through which computing device 100 sends and receives data directly with a remote device, using wired or wireless communication. That is, in some examples of direct device communication 124, data sent by computing device 100 may not be forwarded by one or more additional devices before being received at the remote device, and vice-versa. Examples of direct device communication 124 may include Bluetooth, Near-Field Communication, Universal Serial Bus, WiFi, infrared, etc. One or more of the remote devices illustrated in FIG. 3 may be operatively coupled with communication unit 104 by communication links 126A-126D. In some examples, communication links 126A-126D may be connections using Bluetooth, Near-Field Communication, Universal Serial Bus, infrared, etc. Such connections may be wireless and/or wired connections.

In the example of FIG. 3, projector 106 receives data from computing device 100. Projector 106 may project graphical content based on the data onto projection screen 108. The example of FIG. 3 shows projector 106 as a tabletop projector and shows projection screen 108 as a freestanding screen. In other examples, computing device 100 may output data for display by other types of projection devices, such as electronic whiteboards, holographic display devices, and other suitable devices for displaying graphical content.

In some examples, projector 106 may determine one or more user inputs (e.g., continuous gestures, multi-touch gestures, single-touch gestures, etc.) at projection screen 108 and send indications of such user input to computing device 100. In such examples, projector 106 may use optical recognition or other suitable techniques to determine the user input. Projection screen 108 (e.g., an electronic whiteboard) may display graphical content based on data received from computing device 100.

Mobile device 110 and visual display device 112 may each have computing and connectivity capabilities and may each receive data that computing device 100 output for display. Examples of mobile device 110 may include e-reader devices, convertible notebook devices, hybrid slate devices, etc. Examples of visual display device 112 may include televisions, computer monitors, etc. As shown in FIG. 3, projection screen 108 may include a presence-sensitive display 128, mobile device 110 may include a presence-sensitive display 130, and visual display device 112 may include a presence-sensitive display 132. Presence-sensitive displays 128, 130, 132 may have some or all of the functionality described in this disclosure for UI device 4. In some examples, presence-sensitive displays 128, 130, 132 may include functionality in addition to the functionality of UI device 4. Presence-sensitive displays 128, 130, 132 may receive data from computing device 100 and may display graphical content based on the data. In some examples, presence-sensitive displays 128, 130, 132 may determine one or more user inputs (e.g., continuous gestures, multi-touch gestures, single-touch gestures, etc.) and send indications of such user input to computing device 100. Presence-sensitive displays 128, 130, and/or 132 may use capacitive, inductive, optical recognition techniques and/or other techniques to determine the user input.

In some examples, computing device 100 does not output data for display by presence-sensitive display 102. In other examples, computing device 100 may output data for display such that both presence-sensitive display 102 and the one or more remote devices display the same graphical content. In such examples, each respective device may display the same graphical content substantially contemporaneously. In such examples, the respective devices may display the graphical content at different times due to communication latency. In other examples, computing device 100 may output data for display such that presence-sensitive display 102 and the one or more remote devices display different graphical content.

In the example of FIG. 3, computing device 100 may output, for display at display device 116, projector 106, mobile computing device 110, visual display device 112, etc., graphical keyboard 12. In accordance with one or more techniques of this disclosure, graphical keyboard 12 may include a group of keys for a user's left thumb and a separate group of keys for the user's right thumb. The group of keys for the user's left thumb may surround a first central area of graphical keyboard 12. The group of keys for the user's left thumb may form a square, circle, rectangle, oval, or other shape such that no key of the group of keys for the user's left thumb is next to more than two other keys in the group of keys for the user's left thumb. Similarly, the group of keys for the user's right thumb may surround a second central area of graphical keyboard 12. The group of keys for the user's right thumb may form a square, circle, rectangle, oval, or other shape such that no key of the group of keys for the user's right thumb is next to more than two other keys in the group of keys for the user's right thumb. For each respective letter key in the group of keys for the user's left thumb, the respective key in the group of keys for the user's left thumb and at least one adjacent key in the group of keys for the user's left thumb correspond to keys that are positioned adjacent to one another in a standard QWERTY-style keyboard. For each respective letter key in the group of keys for the user's right thumb, the respective key in the group of keys for the user's right thumb and at least one adjacent key in the group of keys for the user's right thumb correspond to keys that are positioned adjacent to one another in a standard QWERTY-style keyboard.

Furthermore, computing device 100 may receive (e.g., via communication channels 114A, 114B, etc.) indications of user input to select one or more keys of graphical keyboard 12. In some examples, the indications of user input may comprise indications of tapping gestures or sliding gestures at locations that correspond to particular graphical keys of graphical keyboard 12. In response, computing device 100 may output (e.g., via communication channels 114A, 114B, etc.) one or more characters corresponding to the one or more selected keys for display on one or more display devices (e.g., display device 116, projector 106, presence-sensitive displays 128, 130, 132, etc.).

Figure 4:
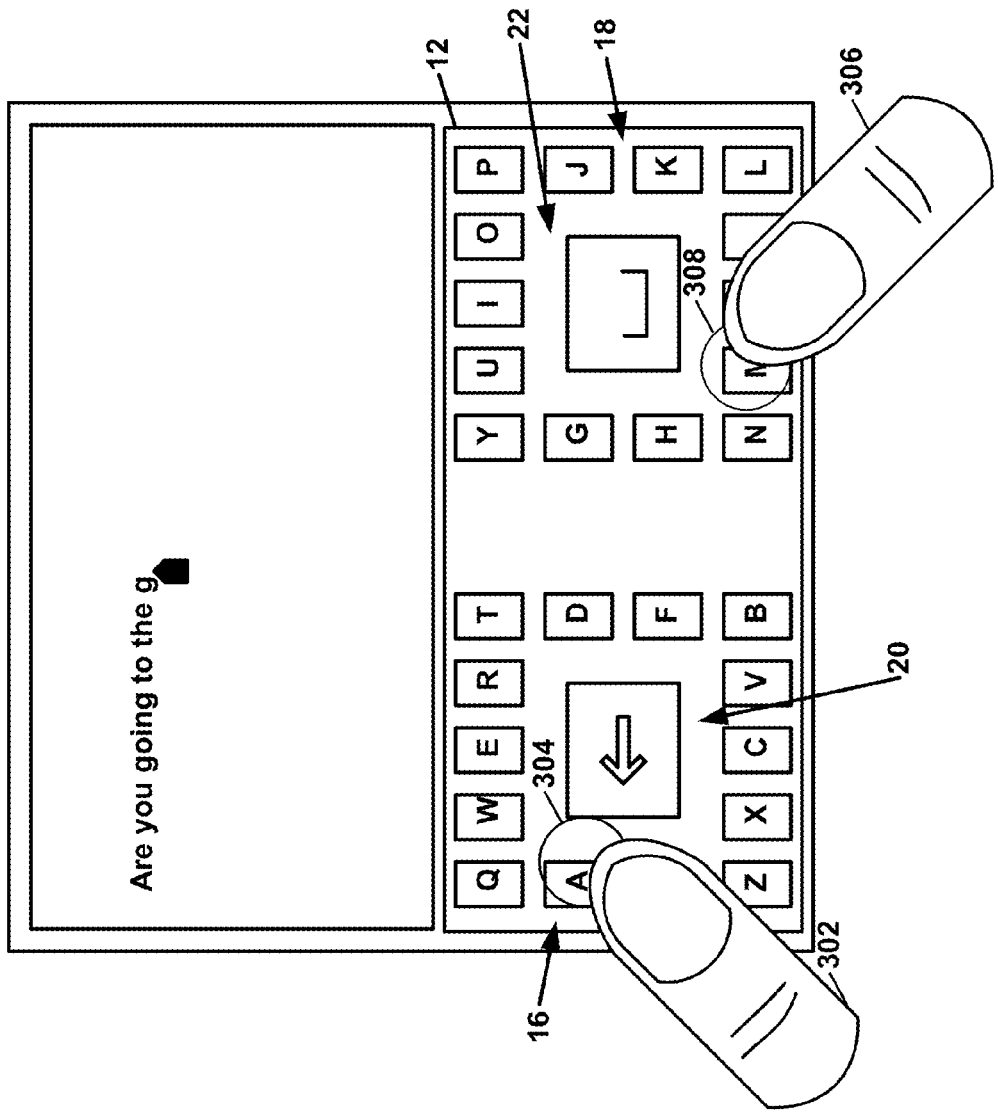
FIG. 4 is a conceptual diagram illustrating an example typing technique using tapping gestures, in accordance with one or more techniques of this disclosure.

FIG. 4 is a conceptual diagram illustrating an example typing technique using tapping gestures, in accordance with one or more techniques of this disclosure. As described elsewhere in this disclosure, computing device 2 may receive an indication of user input to select a key (e.g., a letter key) in subset 16 or subset 18. Responsive to receiving the indication of user input to select the key, computing device 2 may output a symbol (e.g., a letter, punctuation mark, number) corresponding to the selected key for display. In some examples, computing device 2 may output the symbol corresponding to the selected key for display in text entry area 14 of GUI 10 (FIG. 1).

In the example of FIG. 4, the user input to select a key in subset 16 or subset 18 may comprise a tapping gesture at a location corresponding to the key. In other words, computing device 2 may receive an indication of a selection of a key when computing device 2 receives an indication of a tapping gesture at a location corresponding to the key. A tapping gesture may comprise (e.g., consist of) a short tap of an input object, such as a user's finger, at a particular location on a surface of a presence-sensitive display device. Thus, in the example of FIG. 4, computing device 2 may receive an indication of user input to select one or more letter keys of subset 16 or subset 18 by receiving an indication of one or more tapping gestures at respective locations corresponding to the selected one or more letter keys.

In the example of FIG. 4, the user is entering the character string "Are you going to the game?" However, the user has only entered the first letter of the word "game." Accordingly, to input the next letter of the word "game," the user may use the user's left thumb 302 to perform a tapping gesture at a location corresponding to the key for the letter "a." In the example of FIG. 4, circle 304 indicates a location at which the user performs the tapping gesture. Note that the location corresponding to the desired letter does not need to be perfectly aligned with a location at which the desired letter is displayed. Furthermore, to input the letter "m," the user may use the user's right thumb 306 to perform a tapping gesture at a location corresponding to the key for the letter "m." In the example of FIG. 4, circle 308 indicates a location corresponding to the key for the letter "m." Circles 304, 308 are shown in FIG. 4 for reference purposes, and in some examples are not displayed in graphical keyboard 12.

Figure 5:
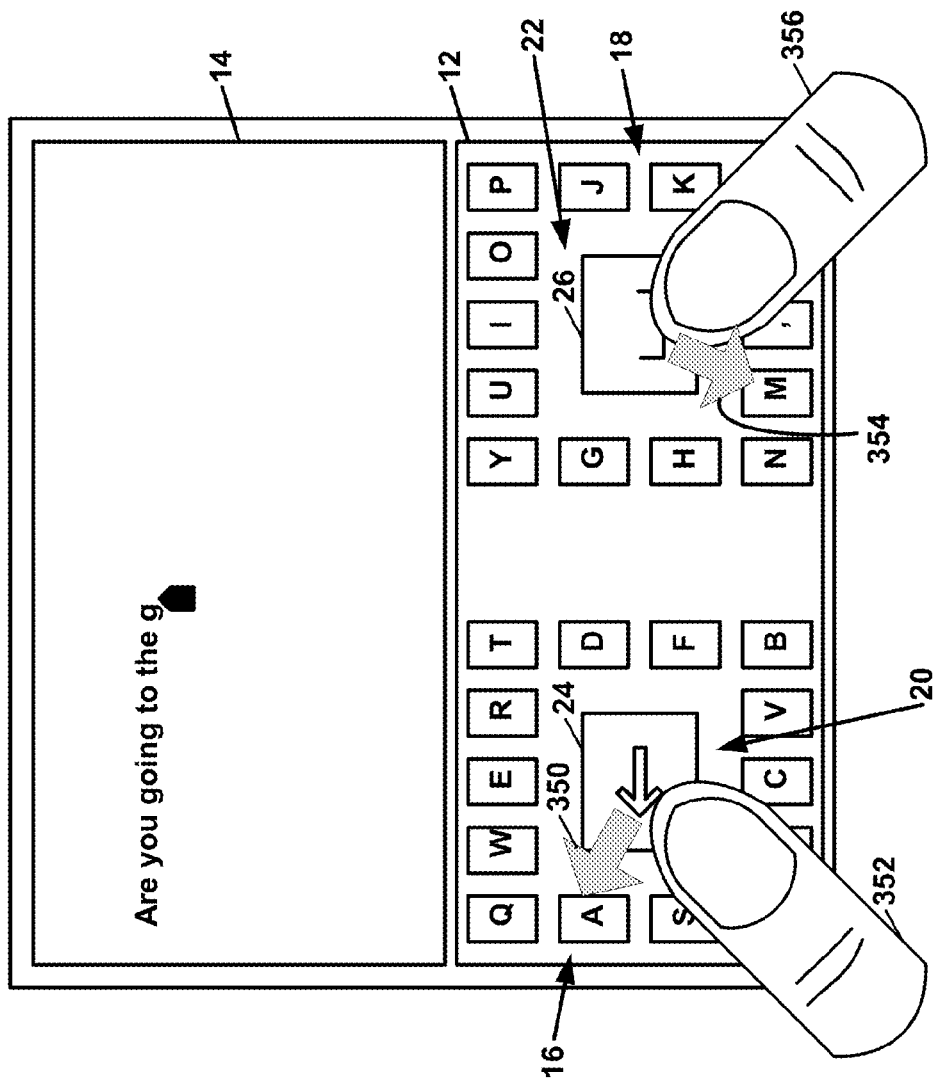
FIG. 5 is a conceptual diagram illustrating an example typing technique using sliding gestures, in accordance with one or more techniques of this disclosure.

FIG. 5 is a conceptual diagram illustrating example typing technique using sliding gestures, in accordance with one or more techniques of this disclosure. In the example of FIG. 5, the user input to select a key in subset 16 or subset 18 may comprise a sliding motion of a thumb from central areas 20 or 22 in the direction of the key. Performing sliding motions may increase typing speed for at least some users, thereby improving the functionality and utility of computing device 10. During the sliding motion, the thumb may remain in contact with a surface of a display device that is displaying graphical keyboard 12. In some examples, the user input to select a key in subset 16 or subset 18 may comprise (e.g., consist of) a sliding motion of a thumb. In some examples, the user input to select a key in subset 16 or subset 18 may consist of a sliding motion of a thumb on a surface of a display device displaying graphical keyboard 12, followed by removal of the thumb from the surface of the display device after the thumb has reached a location corresponding to the key. Removing the thumb from the surface of the display device may comprise lifting the thumb off of the surface of the display device. Thus, in the example of FIG. 5, computing device 2 may receive an indication of user input to select one or more letter keys of subset 16 or subset 18 at least in part by receiving an indication of a sliding gesture toward a location corresponding to a letter key of subset 16 or subset 18.

Figure 6:
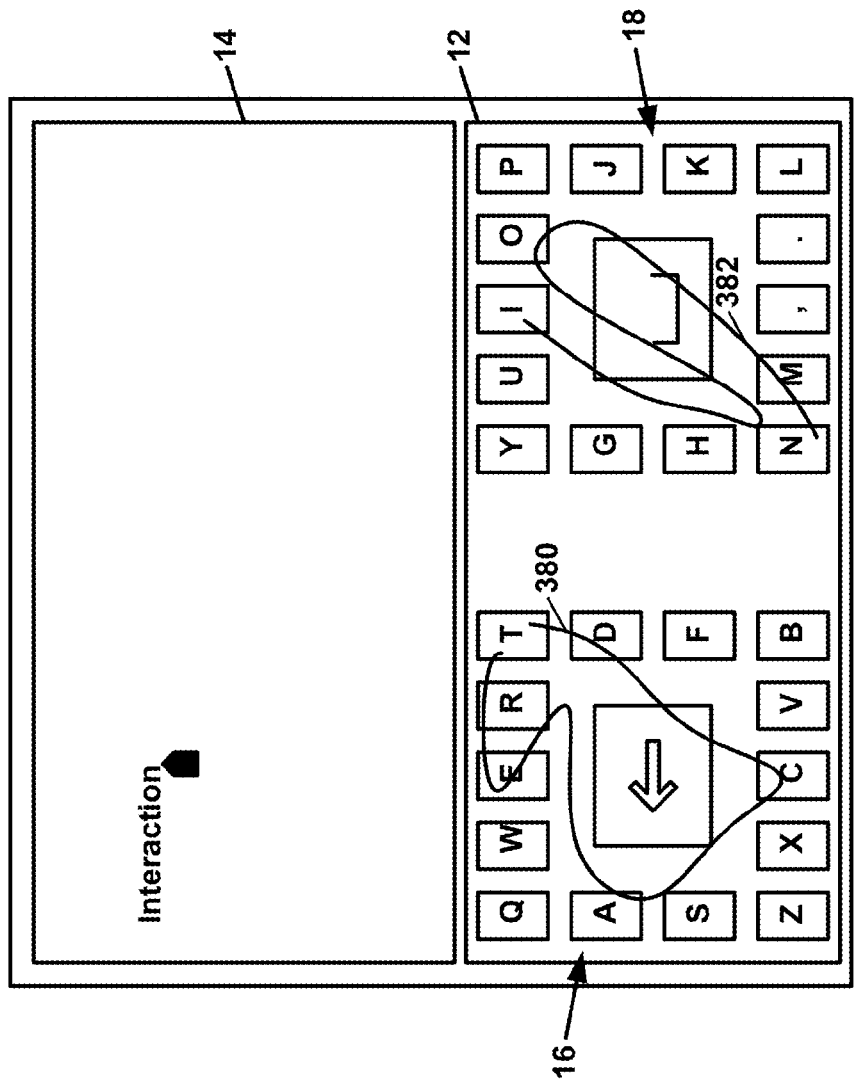
FIG. 6 is a conceptual diagram illustrating another example typing technique using sliding gestures, in accordance with one or more techniques of this disclosure.

In the example of FIG. 5, the user is entering the character string "Are you going to the game?" However, the user has only entered the first letter of the word "game." As illustrated by arrow 350 in the example of FIG. 6, the user input to select the key corresponding to the letter A may comprise a sliding movement of the user's left thumb 352 from central area 20 in the direction of (i.e., towards) the key corresponding to the letter A. Computing device 2 may determine that a sliding movement from central area 20 in the direction of a key in subset 16 is not a selection of central key 24, while computing device 2 may determine that a tapping gesture at a location corresponding to central key 24 is a selection of central key 24. Similarly, as illustrated by arrow 354 in the example of FIG. 6, the user input to select the key corresponding to the letter M may comprise a sliding movement of the user's right thumb 356 from central area 22 in the direction of (i.e., towards) the key corresponding to the letter M. Computing device 2 may determine that a sliding movement from central area 22 in the direction of a key in subset 18 is not a selection of central key 26, while computing device 2 may determine that a tapping gesture at a location corresponding to central key 26 is a selection of central key 26. Arrows 350, 354 are shown in FIG. 5 for reference purposes, and in some examples are not displayed in graphical keyboard 12.

In the example of FIG. 5, in addition to determining that an indication of sliding gestures in the direction of keys corresponds to selections of the keys, computing device 2 may also receive indications of user input to select keys (including the space and backspace keys) when computing device 2 receives indications of tapping gestures at locations corresponding to the keys.

FIG. 6 is a conceptual diagram illustrating another example typing technique using sliding gestures, in accordance with one or more techniques of this disclosure. In the example of FIG. 6, computing device 2 may implement a bi-manual text entry method of a type similar to that described in Bi et al., "Bimanual Gesture Keyboard," UIST '12 Proceedings of the 25$^{th}$ annual ACM symposium on user interface software and technology, pages 137-146, ACM, New York, N.Y., USA, 2012. The bi-manual text entry method of Bi et al. provides for a gesture typing method in which the user enters text by performing sliding gestures with their two thumbs. Thus, the user's thumbs may trace out two separate paths on separate portions of a graphical keyboard to input a single word. In some examples, when the user performs the sliding motions, the user's thumbs remain in contact with a surface of a display device displaying graphical keyboard 12. Performing sliding motions may increase typing speed for at least some users, thereby improving the functionality and utility of computing device 10. For instance, although the horizontal density of the top and bottom rows of keys in graphical keyboard 12 is greater than in the standard QWERTY-style keyboard, the greater vertical stretch of graphical keyboard 12 may enhance gesture typing in the manner of FIG. 6. Gesture typing decoding algorithms of the type that may be used in the example of FIG. 6 may give more weight to angular signals for the layout of graphical keyboard 12.

In the example of FIG. 6, the user is entering the word "interaction." In this example, the user's left thumb traces out a path 380 on a portion of a display device displaying keys of subset 16. The user's right thumb traces out a path 382 on a portion of the display device displaying keys of subset 18. Initially, computing device 2 may receive an indication of a presence of the user's right thumb at a location corresponding to the key for the letter "i" prior to receiving an indication of the presence of the user's left thumb. Computing device 2 may then receive an indication of a sliding motion of the user's right thumb to a location corresponding to the key for the letter "n." Next, computing device 2 may receive an indication of the presence of the user's left thumb at a location corresponding to the key for the letter "t." Computing device 2 may then receive an indication of a sliding motion of the user's left thumb to a location corresponding to the key for the letter "e." Computing device 2 may continue receiving indications of user input in this manner for each of the letters of the word "interaction." In some examples, upon determining that the sliding motions of the user's thumbs correspond to a known word (e.g., a word in a lexicon), computing device 2 may output the word for display in text entry area 14. In the example of FIG. 6, computing device 2 may also receive indications of user input to select keys (including the space and backspace keys) when computing device 2 receives indications of tapping gestures at locations corresponding to the keys.

Figure 7:
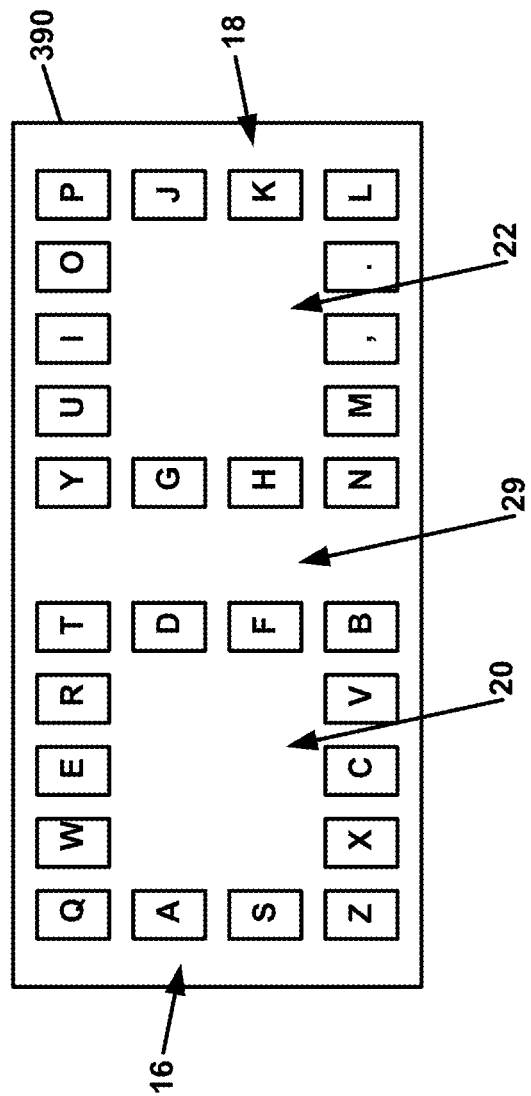
FIG. 7 is a flowchart illustrating an example version of a graphical keyboard, in accordance with one or more techniques of this disclosure.

FIG. 7 is a flowchart illustrating an example version of a graphical keyboard 390, in accordance with one or more techniques of this disclosure. Graphical keyboard 390 is distinct from the version of graphical keyboard 12 shown in FIGS. 1, 4, 5, and 6 in that graphical keyboard 390 does not include central keys. However, graphical keyboard 390 may be used in general accordance with examples related to graphical keyboard 12 provided elsewhere in this disclosure.

Figure 8:
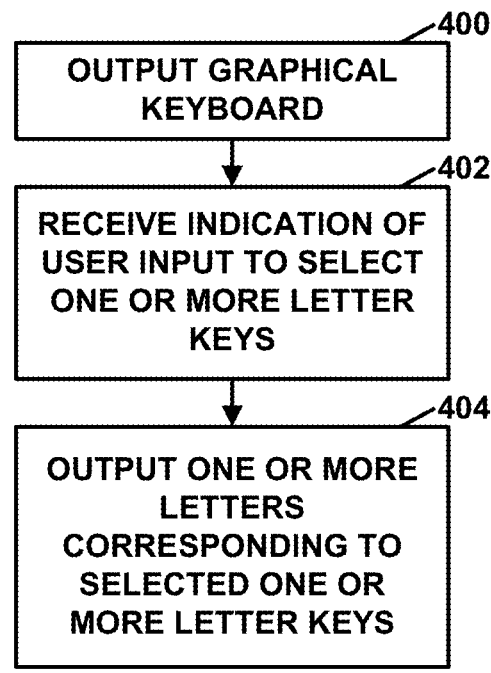
FIG. 8 is a flowchart illustrating an operation of a computing device, in accordance with one or more techniques of this disclosure.

FIG. 8 is a flowchart illustrating an example operation, in accordance with one or more techniques of this disclosure. The operation of FIG. 8 is presented as an example. Other examples may include more, fewer, or different actions. For purposes of illustration only, the operations of FIG. 8 will be described in reference to computing device 2 (FIG. 1, FIG. 2).

In the example of FIG. 8, computing device 2 may output, for display, a graphical keyboard (400). In some examples, computing device 2 may output the graphical keyboard for display at a display device (e.g., user interface device 4, display device 116, projector 106, presence-sensitive display 130, presence-sensitive display 132). As described elsewhere in this disclosure, computing device 2 may use various technologies and techniques to output the graphical keyboard for display.

In accordance with one or more techniques of this disclosure, the graphical keyboard comprises at least a first subset of keys (e.g., subset 16) and a second subset of keys (e.g., subset 18). The first subset of keys is arranged to form a first shape (e.g., rectangle, ellipse) that encloses a first central area of the graphical keyboard (e.g., central area 20), such that no key of the first subset of keys is adjacent to more than two other keys in the first subset of keys. The second subset of keys is arranged to form a second shape (e.g., rectangle, ellipse) that encloses a second central area (e.g., central area 22) of the graphical keyboard, such that no key of the second subset of keys is adjacent to more than two other keys in the second subset of keys.

Furthermore, in accordance with one or more techniques of this disclosure, for each respective letter key in the first subset of keys, the respective letter key in the first subset of keys and at least one adjacent key in the first subset of keys correspond to keys that are positioned adjacent to one another in a standard QWERTY-style keyboard. For each respective letter key in the second subset of keys, the respective letter key in the second subset of keys and at least one adjacent key in the second subset of keys correspond to keys that are positioned adjacent to one another in the standard QWERTY-style keyboard. Each respective letter key in the first subset of keys and each respective letter key in the second subset of keys may correspond to a different letter.

In the example of FIG. 8, computing device 2 may receive an indication of user input to select one or more letter keys of the first subset of keys or the second subset of keys (402). As described elsewhere in this disclosure, computing device 2 may receive the indication of user input in various ways. Responsive to receiving an indication of user input to select one or more letter keys of the first subset of keys or the second subset of keys, computing device 2 may output, for display, one or more letters corresponding to the selected one or more letter keys of the first subset of keys or the second subset of keys (404). For instance, computing device 2 may receive an indication of user input to select a letter key corresponding to the letter "c" and, in response, may output, for display in text entry area 14, the letter "c."

The following paragraphs describe various examples of this disclosure.

Example 1

A method comprising: outputting, by a computing device and for display, a graphical keyboard, wherein: the graphical keyboard comprises a first subset of keys and a second subset of keys, the first subset of keys being arranged to form a first shape that encloses a first central area of the graphical keyboard, such that no key of the first subset of keys is adjacent to more than two other keys in the first subset of keys, the second subset of keys is arranged to form a second shape that encloses a second central area of the graphical keyboard, such that no key of the second subset of keys is adjacent to more than two other keys in the second subset of keys, for each respective letter key in the first subset of keys, the respective letter key in the first subset of keys and at least one adjacent key in the first subset of keys correspond to keys that are positioned adjacent to one another in a standard QWERTY-style keyboard, and for each respective letter key in the second subset of keys, the respective letter key in the second subset of keys and at least one adjacent key in the second subset of keys correspond to keys that are positioned adjacent to one another in the standard QWERTY-style keyboard, wherein each respective letter key in the first subset of keys and each respective letter key in the second subset of keys corresponds to a different letter; and responsive to receiving an indication of user input to select one or more letter keys of the first subset of keys or the second subset of keys, outputting, by the computing device and for display, one or more letters corresponding to the selected one or more letter keys of the first subset of keys or the second subset of keys.

Example 2

The method of example 1, wherein: the first central area comprises a first central key of the graphical keyboard, the first central key corresponding to a backspace character, and the second central area comprises a second central key of the graphical keyboard, the second central key corresponding to a space character.

Example 3

The method of any of examples 1 or 2, wherein each of the first and second shapes is a rectangle or a square.

Example 4

The method of any of examples 1-3, wherein receiving the indication of user input to select one or more letter keys of the first subset of keys or the second subset of keys comprises receiving, by the computing device, an indication of one or more tapping gestures at respective locations corresponding to the selected one or more letter keys.

Example 5

The method of any of examples 1-3, wherein receiving the indication of user input to select one or more letter keys of the first subset of keys or the second subset of keys comprises receiving, by the computing device, an indication of a sliding gesture toward a location corresponding to a letter key of the first subset of keys or the second subset of keys.

Example 6

The method of any of examples 1-5, wherein outputting the graphical keyboard comprises outputting, by the computing device and for display, the graphical keyboard such that each key of the first subset of keys is accessible by a first thumb of a user and each key of the second subset of keys is accessible by a second thumb of the user without the user adjusting a grip of a housing of the computing device.

Example 7

The method of any of examples 1-6, wherein the graphical keyboard comprises a gap separating the first subset of keys and the second subset of keys, wherein a width of the gap is greater than a distance between any two keys in the first or second subsets of keys.

Example 8

The method of any of examples 1-7, wherein the graphical keyboard comprises one or more keys that do not correspond to letters and that are positioned between the first and second subsets of keys.

Example 9

The method of any of examples 1-8, wherein the first subset of keys includes at least one key corresponding to a punctuation mark.

Example 10

The method of any of examples 1-9, wherein: for each respective key in the first subset of keys, the respective key is adjacent to at most two other keys in the first subset of keys in a horizontal or vertical direction; and for each respective key in the second subset of keys, the respective key is adjacent to at most two other keys in the second subset of keys in a horizontal or vertical direction.

Example 11

The method of any of examples 1-10, further comprising: receiving, by the computing device, an indication of a second user input, the second user input corresponding to a long tap gesture at a location corresponding to the first central area; and responsive to receiving the indication of the second user input, outputting, by the computing device and for display, keys corresponding to alternate symbols or operations in place of the first subset of keys.

Example 12

A computing device comprising: one or more processors, wherein the one or more processors are configured to: output, for display, a graphical keyboard, wherein: the graphical keyboard comprises a first subset of keys and a second subset of keys, the first subset of keys is arranged to form a first rectangle or ellipse that encloses a first central area of the graphical keyboard, such that no key of the first subset of keys is adjacent to more than two other keys in the first subset of keys, the second subset of keys is arranged to form a second rectangle or ellipse that encloses a second central area of the graphical keyboard, such that no key of the second subset of keys is adjacent to more than two other keys in the second subset of keys, for each respective letter key in the first subset of keys, the respective letter key in the first subset of keys and at least one adjacent key in the first subset of keys correspond to keys that are positioned adjacent to one another in a standard QWERTY-style keyboard, and for each respective letter key in the second subset of keys, the respective letter key in the second subset of keys and at least one adjacent key in the second subset of keys correspond to keys that are positioned adjacent to one another in the standard QWERTY-style keyboard, wherein each respective letter key in the first subset of keys and each respective letter key in the second subset of keys corresponds to a different letter; and responsive to receiving an indication of user input to select one or more letter keys of the first subset of keys or the second subset of keys, output, for display, one or more letters corresponding to the selected one or more letter keys of the first subset of keys or the second subset of keys.

Example 13

The computing device of example 12, wherein the one or more processors are configured to receive the indication of the user input to select the one or more letter keys when the one or more processors receive an indication of a sliding gesture toward a location corresponding to the one or more letter keys of the first subset of keys or the second subset of keys.

Example 14

The computing device of any of examples 12 or 13, wherein the one or more processors are configured to output, for display, the graphical keyboard such that each key of the first subset of keys is accessible by a first thumb of a user and each key of the second subset of keys is accessible by a second thumb of the user without the user adjusting a grip of the user on a housing of the computing device.

Example 15

The computing device of any of examples 12-14, wherein the graphical keyboard comprises a gap separating the first subset of keys and the second subset of keys, a width of the gap being greater than a distance between any two keys in the first or second subsets of keys.

Example 16

The computing device of any of examples 12-15, wherein the graphical keyboard comprises one or more keys that do not correspond to letters and that are positioned between the first and second subsets of keys.

Example 17

The computing device of any of examples 12-16, wherein: the first subset of keys comprises letter keys corresponding to letters Q, W, E, R, T, A, D, S, F, Z, W, X, C, V, and B, and the second subset of keys comprises letter keys corresponding to letters Y, U, I, O, P, G, J, H, K, N, M, and L.

Example 18

The computing device of example 17, wherein: the first shape is a rectangle and the second shape is a rectangle, a top row of the first subset of keys consists of letter keys corresponding to letters Q, W, E, R, and T; a top row of the second subset of keys consists of letter keys corresponding to letters Y, U, I, O, P; a second row of the first subset of keys consists of letter keys corresponding to letters A and D; a second row of the second subset of keys consists of letter keys corresponding to letters G and J; a third row of the first subset of keys consists of letter keys corresponding to letters S and F; a third row of the second subset of keys consists of letter keys corresponding to letters H and K; a fourth row of the first subset of keys consists of letter keys corresponding to letters Z, X, C, V, and B; and a fourth row of the second subset of keys comprises letter keys corresponding to letters N, M, and L.

Example 19

The computing device of any of examples 12-18, wherein: for each respective key in the first subset of keys, the respective key is adjacent to at most two other keys in the first subset of keys in a horizontal or vertical direction; and for each respective key in the second subset of keys, the respective key is adjacent to at most two other keys in the second subset of keys in a horizontal or vertical direction.

Example 20

A computer-readable data storage device having instructions stored thereon that, when executed, cause one or more processors to: output, for display, a graphical keyboard, wherein: the graphical keyboard comprises a first subset of keys and a second subset of keys, the first subset of keys is arranged to form a first rectangle that encloses a first central area of the graphical keyboard, such that no key of the first subset of keys is adjacent to more than two other keys in the first subset of keys, the second subset of keys is arranged to form a second rectangle that encloses a second central area of the graphical keyboard, such that no key of the second subset of keys is adjacent to more than two other keys in the second subset of keys, for each respective letter key in the first subset of keys, the respective key in the first subset of keys and at least one adjacent key in the first subset of keys correspond to keys that are positioned adjacent to one another in a standard QWERTY-style keyboard; for each respective letter key in the second subset of keys, the respective key in the second subset of keys and at least one adjacent key in the second subset of keys correspond to keys that are positioned adjacent to one another in the standard QWERTY-style keyboard, wherein each respective letter key in the first subset of keys and each respective letter key in the second subset of keys corresponds to a different letter; for each respective key in the first subset of keys, the respective key is adjacent to at most two other keys in the first subset of keys in a horizontal or vertical direction, and for each respective key in the second subset of keys, the respective key is adjacent to at most two other keys in the second subset of keys in a horizontal or vertical direction; and responsive to receiving an indication of user input to select one or more letter keys of the first subset of keys or the second subset of keys, output, for display, one or more letters corresponding to the selected one or more letter keys of the first subset of keys or the second subset of keys.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples, along with combinations of such examples, are within the scope of the following claims.

The invention claimed is:

1. A method comprising:
outputting, by a computing device and for display, a graphical keyboard, wherein:
the graphical keyboard comprises a first subset of keys and a second subset of keys,
the first subset of keys is arranged, such that the keys of the first subset of keys form a respective perimeter of a first shape that encloses a first central area of the graphical keyboard, such that no key of the first subset of keys is adjacent to more than two other keys in the first subset of keys,
the first central area comprises a backspace character of the graphical keyboard,
the second subset of keys is arranged, such that the keys of the second subset of keys form a respective perimeter of a second shape that encloses a second central area of the graphical keyboard, such that no key of the second subset of keys is adjacent to more than two other keys in the second subset of keys,
the second central area comprises a space character of the graphical keyboard,
for each respective letter key in the first subset of keys, the respective letter key in the first subset of keys and at least one adjacent key in the first subset of keys correspond to keys that are positioned adjacent to one another in a standard QWERTY-style keyboard, and
for each respective letter key in the second subset of keys, the respective letter key in the second subset of keys and at least one adjacent key in the second subset of keys correspond to keys that are positioned adjacent to one another in the standard QWERTY-style keyboard, wherein each respective letter key in the first subset of keys and each respective letter key in the second subset of keys corresponds to a different letter; and
responsive to receiving an indication of user input to select one or more letter keys of the first subset of keys or the second subset of keys, outputting, by the computing device and for display, one or more letters corresponding to the selected one or more letter keys of the first subset of keys or the second subset of keys.

2. The method of claim 1, wherein each of the first and second shapes is a rectangle or a square.

3. The method of claim 1, wherein receiving the indication of user input to select one or more letter keys of the first subset of keys or the second subset of keys comprises receiving, by the computing device, an indication of one or more tapping gestures at respective locations corresponding to the selected one or more letter keys.

4. The method of claim 1, wherein receiving the indication of user input to select one or more letter keys of the first subset of keys or the second subset of keys comprises receiving, by the computing device, an indication of a sliding gesture toward a location corresponding to a letter key of the first subset of keys or the second subset of keys.

5. The method of claim 1, wherein outputting the graphical keyboard comprises outputting, by the computing device and for display, the graphical keyboard such that each key of the first subset of keys is accessible by a first thumb of a user and each key of the second subset of keys is accessible by a second thumb of the user without the user adjusting a grip of a housing of the computing device.

6. The method of claim 1, wherein the graphical keyboard comprises a gap separating the first subset of keys and the second subset of keys, wherein a width of the gap is greater than a distance between any two keys in the first or second subsets of keys.

7. The method of claim 1, wherein the graphical keyboard comprises one or more keys that do not correspond to letters and that are positioned between the first and second subsets of keys.

8. The method of claim 1, wherein the first subset of keys includes at least one key corresponding to a punctuation mark.

9. The method of claim 1, wherein:
for each respective key in the first subset of keys, the respective key is adjacent to at most two other keys in the first subset of keys in a horizontal or vertical direction; and
for each respective key in the second subset of keys, the respective key is adjacent to at most two other keys in the second subset of keys in a horizontal or vertical direction.

10. The method of claim 1, further comprising:
receiving, by the computing device, an indication of a second user input, the second user input corresponding to a long tap gesture at a location corresponding to the first central area; and
responsive to receiving the indication of the second user input, outputting, by the computing device and for display, keys corresponding to alternate symbols or operations in place of the first subset of keys.

11. A computing device comprising:
one or more processors, wherein the one or more processors are configured to:
output, for display, a graphical keyboard, wherein:
the graphical keyboard comprises a first subset of keys and a second subset of keys,
the first subset of keys is arranged, such that the keys of the first subset of keys form a respective perimeter of a first rectangle or ellipse that encloses a first central area of the graphical keyboard, such that no key of the first subset of keys is adjacent to more than two other keys in the first subset of keys,
the first central area comprises a backspace character of the graphical keyboard,
the second subset of keys is arranged, such that the keys of the first subset of keys form a respective perimeter of a second rectangle or ellipse that encloses a second central area of the graphical keyboard, such that no key of the second subset of keys is adjacent to more than two other keys in the second subset of keys,
the second central area comprises a space character of the graphical keyboard,
for each respective letter key in the first subset of keys, the respective letter key in the first subset of keys and at least one adjacent key in the first subset of keys correspond to keys that are positioned adjacent to one another in a standard QWERTY-style keyboard, and
for each respective letter key in the second subset of keys, the respective letter key in the second subset of keys and at least one adjacent key in the second subset of keys correspond to keys that are positioned adjacent to one another in the standard QWERTY-style keyboard, wherein each respective letter key in the first subset of keys and each respective letter key in the second subset of keys corresponds to a different letter; and
responsive to receiving an indication of user input to select one or more letter keys of the first subset of keys or the second subset of keys, output, for display, one or more letters corresponding to the selected one or more letter keys of the first subset of keys or the second subset of keys.

12. The computing device of claim 11, wherein the one or more processors are configured to receive the indication of the user input to select the one or more letter keys when the one or more processors receive an indication of a sliding gesture toward a location corresponding to the one or more letter keys of the first subset of keys or the second subset of keys.

13. The computing device of claim 11, wherein the one or more processors are configured to output, for display, the graphical keyboard such that each key of the first subset of keys is accessible by a first thumb of a user and each key of the second subset of keys is accessible by a second thumb of the user without the user adjusting a grip of the user on a housing of the computing device.

14. The computing device of claim 11, wherein the graphical keyboard comprises a gap separating the first subset of keys and the second subset of keys, a width of the gap being greater than a distance between any two keys in the first or second subsets of keys.

15. The computing device of claim 11, wherein the graphical keyboard comprises one or more keys that do not correspond to letters and that are positioned between the first and second subsets of keys.

16. The computing device of claim 11, wherein:
the first subset of keys comprises letter keys corresponding to letters Q, W, E, R, T, A, D, S, F, Z, W, X, C, V, and B, and
the second subset of keys comprises letter keys corresponding to letters Y, U, I, O, P, G, J, H, K, N, M, and L.

17. The computing device of claim 16, wherein:
the first shape is a rectangle and the second shape is a rectangle,
a top row of the first subset of keys consists of letter keys corresponding to letters Q, W, E, R, and T;
a top row of the second subset of keys consists of letter keys corresponding to letters Y, U, I, O, P;
a second row of the first subset of keys consists of letter keys corresponding to letters A and D;
a second row of the second subset of keys consists of letter keys corresponding to letters G and J;
a third row of the first subset of keys consists of letter keys corresponding to letters S and F;
a third row of the second subset of keys consists of letter keys corresponding to letters H and K;
a fourth row of the first subset of keys consists of letter keys corresponding to letters Z, X, C, V, and B; and
a fourth row of the second subset of keys comprises letter keys corresponding to letters N, M, and L.

18. The computing device of claim 11, wherein:
for each respective key in the first subset of keys, the respective key is adjacent to at most two other keys in the first subset of keys in a horizontal or vertical direction; and
for each respective key in the second subset of keys, the respective key is adjacent to at most two other keys in the second subset of keys in a horizontal or vertical direction.

19. A computer-readable data storage device having instructions stored thereon that, when executed, cause one or more processors to:
  output, for display, a graphical keyboard, wherein:
    the graphical keyboard comprises a first subset of keys and a second subset of keys,
    the first subset of keys is arranged, such that the keys of the first subset of keys form a respective perimeter of a first rectangle that encloses a first central area of the graphical keyboard, such that no key of the first subset of keys is adjacent to more than two other keys in the first subset of keys,
    the first central area comprises a backspace character of the graphical keyboard,
    the second subset of keys is arranged, such that the keys of the first subset of keys form a respective perimeter of a second rectangle that encloses a second central area of the graphical keyboard, such that no key of the second subset of keys is adjacent to more than two other keys in the second subset of keys,
    the second central area comprises a space character of the graphical keyboard,
    for each respective letter key in the first subset of keys, the respective key in the first subset of keys and at least one adjacent key in the first subset of keys correspond to keys that are positioned adjacent to one another in a standard QWERTY-style keyboard;
    for each respective letter key in the second subset of keys, the respective key in the second subset of keys and at least one adjacent key in the second subset of keys correspond to keys that are positioned adjacent to one another in the standard QWERTY-style keyboard, wherein each respective letter key in the first subset of keys and each respective letter key in the second subset of keys corresponds to a different letter;
    for each respective key in the first subset of keys, the respective key is adjacent to at most two other keys in the first subset of keys in a horizontal or vertical direction, and
    for each respective key in the second subset of keys, the respective key is adjacent to at most two other keys in the second subset of keys in a horizontal or vertical direction; and
  responsive to receiving an indication of user input to select one or more letter keys of the first subset of keys or the second subset of keys, output, for display, one or more letters corresponding to the selected one or more letter keys of the first subset of keys or the second subset of keys.

* * * * *